United States Patent [19]
Jumpertz et al.

[11] Patent Number: 5,301,665
[45] Date of Patent: Apr. 12, 1994

[54] RESPIRATOR FOR EMERGENCY OXYGEN SUPPLY FOR PASSENGERS IN AIRCRAFT

[75] Inventors: Werner Jumpertz; Christian Schnoor, both of Lübeck, Fed. Rep. of Germany

[73] Assignee: Dragerwerk Aktiengesellschaft, Lubeck, Fed. Rep. of Germany

[21] Appl. No.: 966,718

[22] Filed: Oct. 26, 1992

Related U.S. Application Data

[63] Continuation-in-part of Ser. No. 873,371, Apr. 24, 1992, abandoned.

[30] Foreign Application Priority Data

May 5, 1991 [DE] Fed. Rep. of Germany ....... 4115361
Feb. 15, 1992 [DE] Fed. Rep. of Germany ....... 4204532

[51] Int. Cl.⁵ .......................... A62B 7/08; A62B 7/14
[52] U.S. Cl. .......................... 128/202.26; 128/204.18; 128/205.25; 128/205.21
[58] Field of Search ............. 128/202.26, 200.24, 128/203.16, 203.17, 203.23, 203.26, 203.27, 204.17, 204.18, 204.29, 205.25, 205.21, 205.22; 422/186.04, 186.21; 244/118.5, 129.1

[56] References Cited

U.S. PATENT DOCUMENTS

| | | | |
|---|---|---|---|
| 3,136,312 | 6/1964 | Guttone | 128/205.21 |
| 3,536,070 | 10/1970 | Bouard | 128/202.26 |
| 4,197,213 | 4/1980 | Pietz et al. | 128/202.26 |
| 4,246,229 | 1/1981 | McBride et al. | 128/202.26 |
| 4,481,945 | 11/1984 | Levine | 128/205.25 |
| 4,665,910 | 5/1987 | Kolbe et al. | 128/202.26 |
| 4,766,893 | 8/1988 | Drews | 128/201.29 |
| 4,802,472 | 2/1989 | Jung | 128/204.18 |
| 4,840,171 | 6/1989 | Röhling et al. | 128/204.18 |
| 4,909,247 | 3/1990 | Terisse et al. | 128/204.29 |
| 4,960,120 | 10/1990 | Constance-Hughes | 128/205.22 |
| 5,078,343 | 1/1992 | Howlett | 128/204.29 |

FOREIGN PATENT DOCUMENTS 8611223.6 9/1987 Fed. Rep. of Germany.

Primary Examiner—Edgar S. Burr
Assistant Examiner—Lynn D. Hendrickson
Attorney, Agent, or Firm—McGlew and Tuttle

[57] ABSTRACT

A respirator for emergency oxygen supply for passengers in aircraft, with a mounting container (1), which can be closed with a lid (2), is fastened above the row of seats, and accommodates at least one breathing mask and an exothermic chemical oxygen generator (3) connected to the breathing mask in a holder (4, 5). The pivotability of the lid of the mounting container is improved by rigidly arranging the holder on the mounting container (1) such that it permits the oxygen generator (3) to change its place by pivoting in the case of use.

16 Claims, 7 Drawing Sheets

RESPIRATOR FOR EMERGENCY OXYGEN SUPPLY FOR PASSENGERS IN AIRCRAFT

CROSS-REFERENCE TO RELATED APPLICATIONS

The present application is a continuation-in-part application of application Ser. No. 07/873,371 filed Apr. 24, 1992, now abandoned.

FIELD OF THE INVENTION

The present invention pertains to a respirator for emergency oxygen supply for passengers in aircraft, with a mounting container, which can be closed with a lid, can be fastened above the row of seats, accommodates at least one breathing mask as well as an exothermic chemical oxygen generator connected to the breathing mask in a holder, whose position can be changed between a readiness position and a use position, and by which holder the distance between the oxygen generator and the internal wall surface of the mounting container is increased in the use position.

BACKGROUND OF THE INVENTION

In certain emergency situations in aircraft, it is necessary to enrich the breathing air with oxygen. This may be necessary to raise the oxygen level to a level that permits survival of the user in an atmosphere with reduced oxygen partial pressure, e.g., after a drop in the cabin pressure at high altitude. Therefore, breathing masks connected to chemical oxygen generators are arranged in passenger planes in mounting containers that can be closed with a lid above the passenger seats. The passenger chemical oxygen generators contain, in general, an alkali metal chlorate mixture, which releases oxygen, which can be inhaled via the breathing mask, in an exothermic reaction after activation.

The amount of oxygen to be supplied and consequently the size of the chemical oxygen generator depend on the necessary duration of use. A so-called long-range system, in which the chemical oxygen generators must have a prolonged operating time of up to 22 minutes, is needed especially in the case of prolonged descent time from high altitude.

A considerable amount of heat, which heats the outer wall of the generator housing to about 280° C., is generated in the course of the exothermic reaction in the chemical oxygen generator. Since the mounting container is installed, in general, under the so-called hat racks, the temperature of the mounting container may not exceed a predetermined value even during use, in order not to jeopardize the function of the surrounding components. Moreover, since only a limited space is available for installing the mounting container, the necessary heat insulation cannot, in general, be accommodated within the mounting container.

In an embodiment according to U.S. Pat. No. 4,766,893 (corresponding to DE-A1 36,13,814), the oxygen generator is arranged on the lid of the mounting container, which lid can be opened, and it ensures increased dissipation of heat in the use position. However, the lid attachment of the oxygen generator shows various disadvantages; in particular, because of the considerable weight of the oxygen generator, the lid must be provided with a relatively stable and consequently weight-increasing lid attachment, for which a pivoting range with an angle of 100° is specified to enable the breathing masks to drop freely. In light of these requirements, arranging the oxygen generator on the lid appears to be unsuitable for certain applications.

A mounting container with rigidly installed oxygen generator, in which the heat is dissipated directly onto the mounting container, has been known from, e.g., DE-G 86,11,223.

SUMMARY AND OBJECTS OF THE INVENTION

The present invention is based on the task of improving a respirator with a holder for an oxygen generator such that while sufficient heat dissipation from the oxygen generator to the environment is guaranteed, free mobility of the lid closing the mounting container is not hindered by the oxygen generator.

This task is accomplished by the holder being rigidly mounted on the mounting container such that in the case of use, it permits a change in the position of the oxygen generator by pivoting.

The advantage of the present invention is essentially that by arranging the holder of the oxygen generator on the mounting container, the load on the lid is relieved, so that it is able to freely perform the maximum pivoting stroke specified. In addition, the dissipation of heat from the oxygen generator onto the lid is markedly reduced.

In an advantageous embodiment, the activating device of the oxygen generator may be coupled with the holder of the oxygen generator such that when the lid is opened, the oxygen generator is moved from the readiness position into the use position only in the case of activation. In the practical embodiment, this means that the movement of the oxygen generator in its holder is blocked until the exothermic chemical reaction is activated.

In another advantageous embodiment, a temperature-controllable triggering element, preferably a bimetallic element, may be provided for triggering the movement of the oxygen generator from the readiness position into the use position. The range of movement of the oxygen generator in the use position is preferably limited by a fixed stop or a locking connection.

In an embodiment that was tested in practice, the oxygen generator has a spring-tensioned striking pin, and a locking pin is provided in the striking pin such that when the locking pin is pulled out, the striking pin is released for activation of the oxygen generator, and the pivot mounting of the oxygen generator is also released at the same time, and the oxygen generator will pivot from the readiness position into the use position under the effect of the force of gravity.

The pivoting movement of the oxygen generator may advantageously be supported, if desired, by a pre-tensioned spring.

The oxygen generator is preferably arranged in a cartridge-like, closed housing.

The characteristics of the present invention lead to a respirator in which the oxygen generator has adequate insulation sufficient even for long-range use in the use position, so that installed components are prevented from overheating.

This task is achieved by the holder being designed as a hinged holder which is attached to the oxygen generator and pivots the oxygen generator around a fixed axis on the mounting container between the readiness position and the use position.

The difference between the hinged holder and the pivoting holder is essentially the fact that due to the oxygen generator being connected to a fixed axis on the mounting container, most of the force of the dead weight of the oxygen generator is transmitted in the hinged holder via the body surface, e.g., the jacket surface of the oxygen generator, to the bottom of the mounting container, as a result of which the shock-sensitive activating device with the striking pin, which is used to mount the oxygen generator in the pivoting holder, is relieved.

The hinged holder preferably consists of cartridge holders, which are attached to the jacket surface of the oxygen generator by means of clamping straps and are accommodated, rotatable around axes, in cartridge mounts. The cartridge mounts are rigidly arranged on the bottom surface of the mounting container. The pivoting movement of the oxygen generator is consequently performed around the axes of the cartridge holders as the fulcrum points.

To lock the oxygen generator in the readiness position, the clamping straps of the hinged holder are provided with projections, which may be of a lug-shaped or bead-shaped design.

The activating device of the oxygen generator is advantageously coupled with the hinged holder via a strap such that the strap releases the hinged holder during activation of the oxygen generator, as a result of which the oxygen generator will be moved from the readiness position into the use position. The strap brings about essentially fixation of the oxygen generator in the readiness position, and is blocked by the striking pin of the activating device.

The strap is preferably mounted axially rotatably in strap mounts and has right-angle bends which engage the projections of the clamping straps. Due to the positive locking between the right-angle bends of the strap and the corresponding projections of the clamping straps, the oxygen generator is fixed in the readiness position. The strap mounts may be designed as drilled-through plate folds, which are made in one piece with the mounting container; however, slotted screws and nuts, into whose slots the strap is simply pushed in, have also proved to be advantageous.

It is advantageous to provide the hinged holder with a locking device limiting the range of movement in the use position.

The locking device is preferably designed such that flattened areas are provided on the axes of the cartridge mounts and these flattened areas engage slotted holes of a corresponding shape in the cartridge holders when the oxygen generator is pivoted out into the use position. Wedge-shaped flattened areas, which snap into wedge-shaped slotted holes, have proved to be particularly advantageous.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
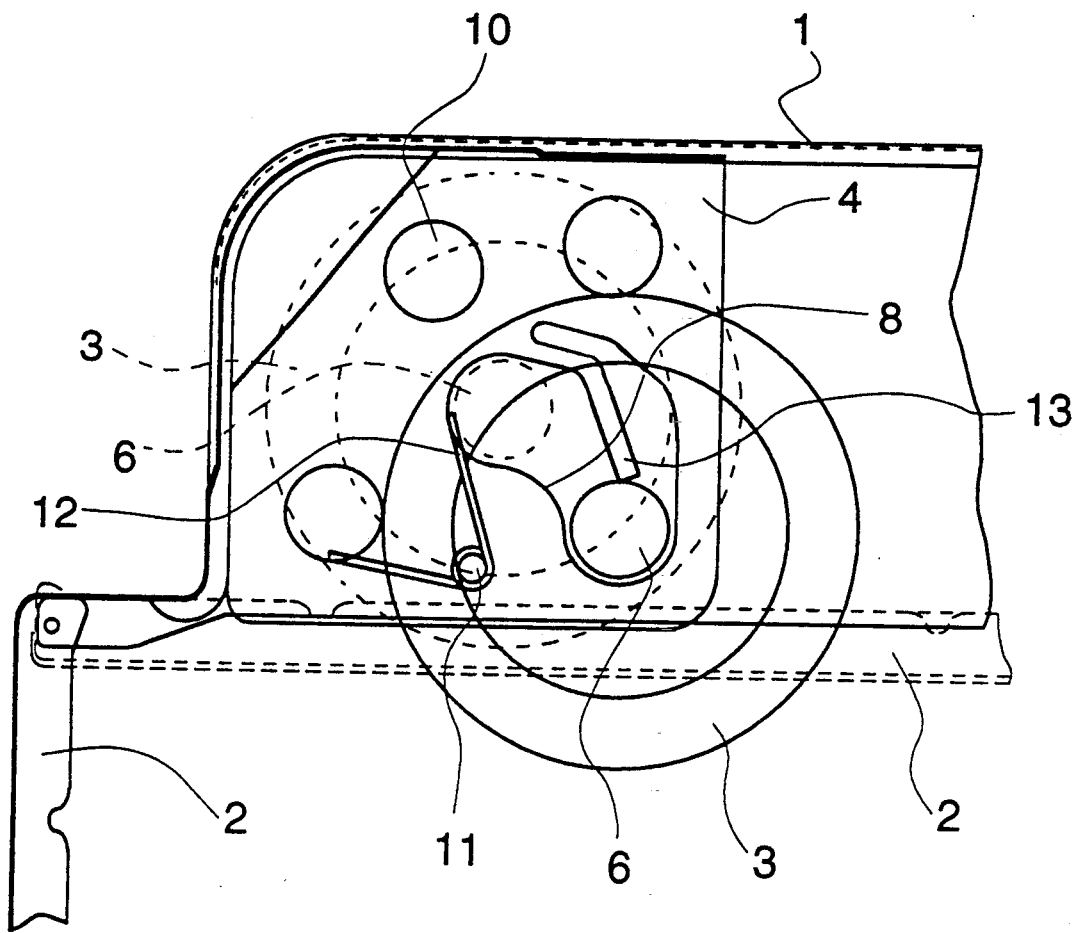
FIG. 1 is a schematic side view of the mounting of the oxygen generator.

FIG. 1 shows a mounting container 1, which is closed with a lid 2 in the readiness position. In the mounting container 1, a cartridge-shaped chemical oxygen generator 3 is pivotably mounted in lateral bearing blocks 4, 5. The positions shown in broken line represent the mounting container with closed lid, wherein the oxygen generator 3 is also located in the readiness position. The components drawn in solid line show the oxygen generator 3 in the pivoted-out use position with the lid 2 opened.

Figure 7:
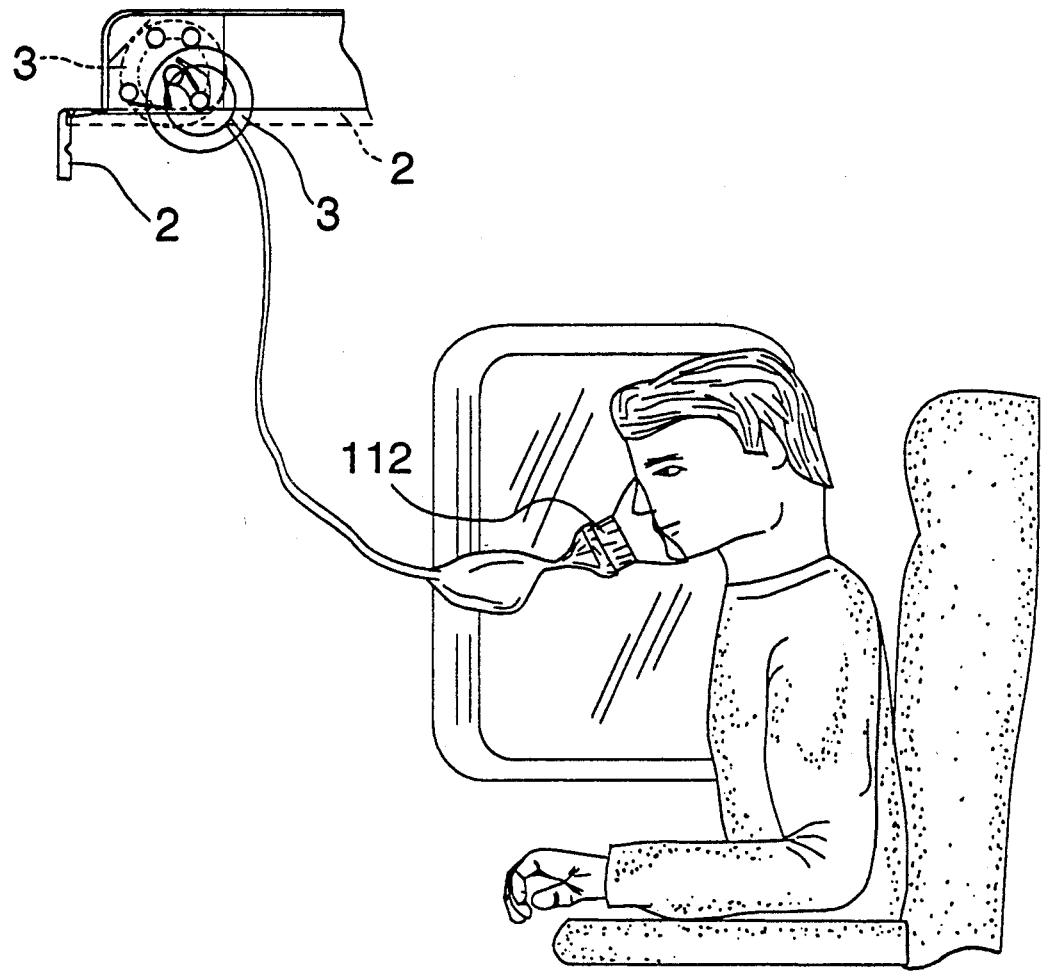
FIG. 7 is an elevation view showing the breathing mask worn by a user wherein the mask is connected to the respirator of FIG. 1 and wherein the mask may likewise be connected to the alternate respirator embodiment of FIG. 4.

Breathing masks, generally three to four, only one mask 112 is shown in FIG. 7, are accommodated in the free interior space of the mounting container 1. Pivot pins 11, which extend into holes of the bearing blocks 4, 5, so that the cartridge-shaped housing of oxygen generator 3 moves around the pivot pins 11 from the readiness position into the use position, are arranged on the front sides of the cartridge-shaped oxygen generator 3. Tube jointing sleeves 6, 7 slide in arc-shaped guide recesses 8, 9 of the bearing blocks 4, 5. The bearing blocks 4, 5 are provided with circular punched-out openings 10 for weight reduction.

To support the pivoting movement of the oxygen generator 3, a wire spring 12, which is in pre-tensioned contact with the tube jointing sleeve 6 in the readiness position of the oxygen generator 3, is provided on a the pivot pin 11.

An elastic tongue 13 acts as a snap on connection or locking connection, which narrows the guide path of the tube jointing sleeves 6, 7, thus decelerates the pivoting movement occurring under the effect of the force of gravity when the lid 2 is opened along the arc-shaped guide recesses 8, 9, and locks the tube jointing sleeves 6, 7 in their end position, i.e., in the use position, is located in the path of movement of the tube jointing sleeves 6, 7.

Figure 3:
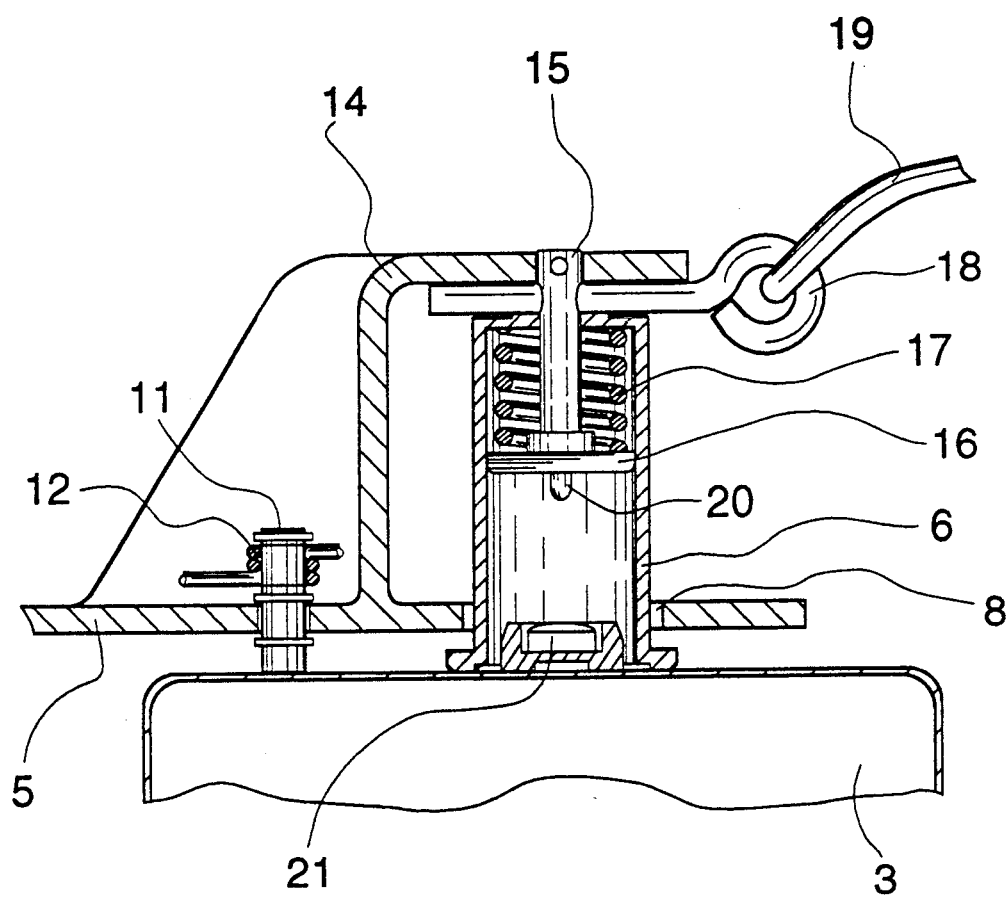
FIG. 3 is a cutaway partial view of the oxygen generator with the activating device.

The activating device of the oxygen generator 3 is explained in greater detail in FIG. 3. In the stand-by position, a striking pin 15 displaceable in the tubular sleeve 6 engages an elbow 14 made in one piece with the bearing bracket 5. A coil spring 17, which is supported in the tubular sleeve and generates a corresponding pre-tension, is in contact with the end piece 16 of the striking pin 15. The end of the striking pin 15 is secured by a locking pin 18, and the striking pin 15 is released when the locking pin 18 is pulled out.

On opening the lid 2, the breathing masks, to which a cable 19 connected to the locking pin 18 is attached, drop out. By pulling the locking pin 18, the striking pin 15 is released, and its igniting tip 20 strikes the igniting device 21, so that the chemical reaction for generating oxygen is started. At the same time, the locking of the oxygen generator 3 in the stand-by position is abolished by the movement of the striking pin 15, and, under the effect of the force of gravity, the cartridge-like oxygen generator 3, performing a rolling movement, moves along the arc-shaped guide recesses 8, 9 into its position of use, in which it is locked by the elastic tongue 13.

Figure 2:
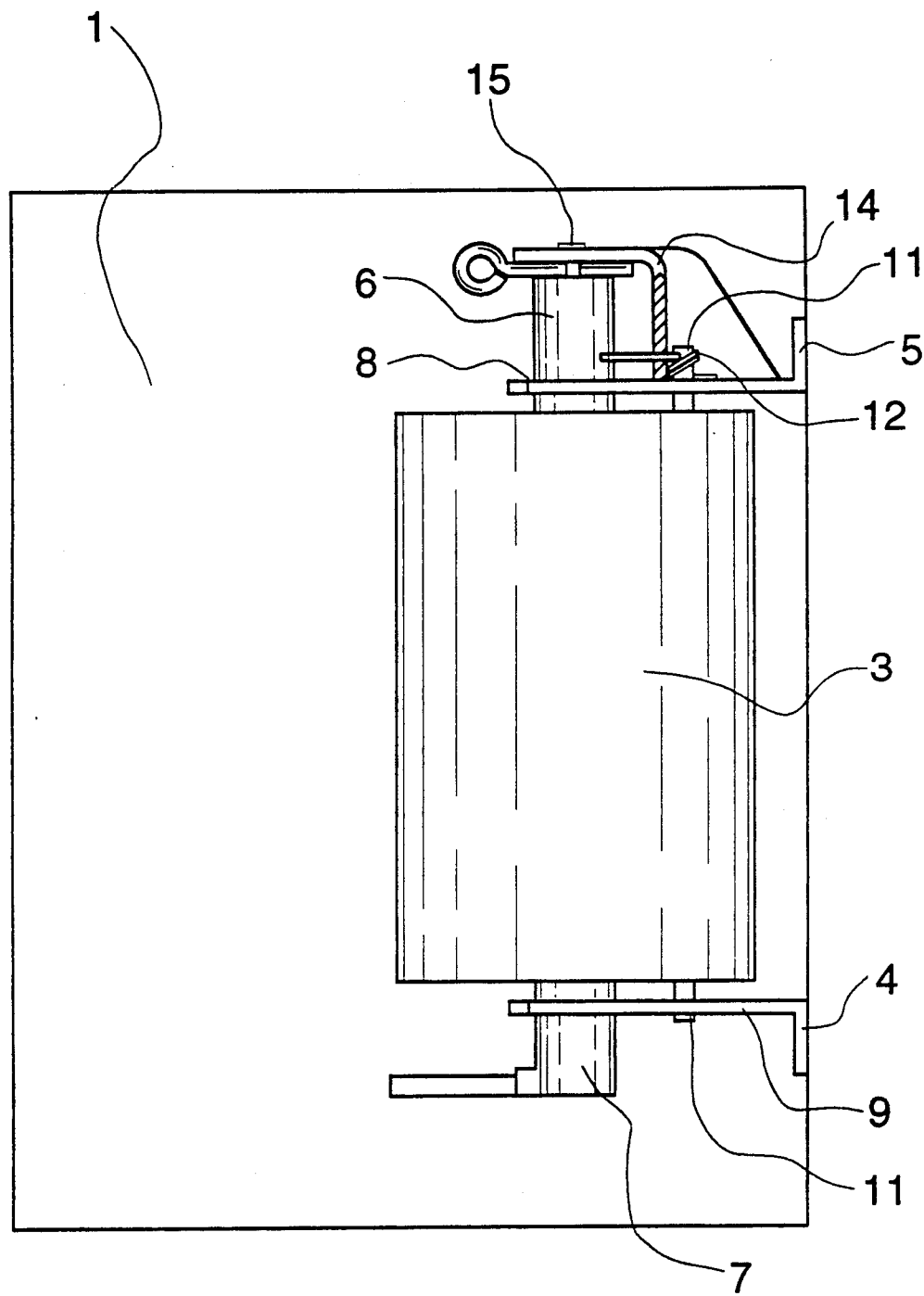
FIG. 2 is schematic a bottom view of the mounting container with the lid removed.
Figure 4:
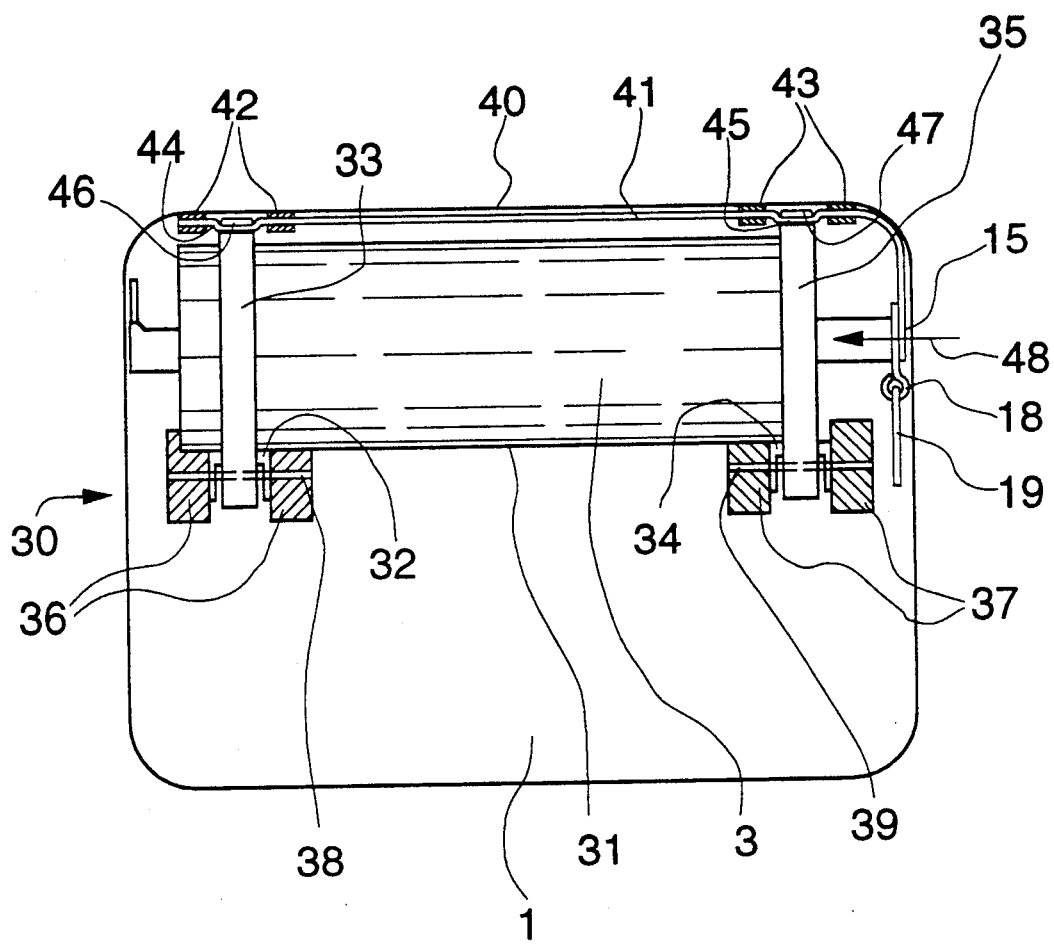
FIG. 4 is a schematic partially sectional view similar to FIG. 2 of an alternative embodiment with a hinged holder for the oxygen generator.

FIG. 4 shows an alternative embodiment for achieving the pivoting movement of the oxygen generator 3 in the form of a hinged holder 30, in a view similar to FIG. 2. Compared with FIG. 2, the striking pin 15 is arranged on the opposite side of the oxygen generator 3. Identical components are designated by the same reference numerals as in FIGS. 1 through 3. What is novel compared with the design according to FIG. 2 is that the oxygen generator 3 is no longer mounted by means of the tube jointing sleeves 6, 7 and the bearing blocks 4, 5 (FIG. 2), but with the hinged holder 30 via the jacket surface 31 of the oxygen generator 3. The hinged holder 30 is designed symmetrically to the oxygen generator 3, and consists of a first cartridge holder 32, which is clamped to the jacket surface 31 of the oxygen generator 3 by means of a first clamping strap 33, and of a second cartridge holder 34, which is attached to the jacket surface 31 by means of a second clamping strap in the same manner as the first cartridge holder 32, as well as of a first cartridge mount 36 and a second cartridge mount 37, in which the first cartridge holder 32 and the second cartridge holder 34, respectively, are pivotably mounted by means of a first axis 38 and a second axis 39, respectively.

In the readiness position shown in FIG. 4, the oxygen generator 3 is located in parallel to a rear lateral surface 40 of the mounting container 1. A strap 41, which is mounted axially rotatably in a first strap mount 42 and a second strap mount 43, also extends in parallel to the rear lateral surface 40; in the area of the strap mounts 42, 43, the strap 41 has a first strap right-angle bend 44 and a second strap right-angle bend 45, which is directed toward the oxygen generator 3.

The strap right-angle bends 44, 45 are located in the area of the clamping straps 33, 35, and the clamping straps 33, 35 are provided with a first projection 46 and a second projection 47, which grip under the strap right-angle bends 44, 45 and thereby fix the oxygen generator 3 in the readiness position. The strap 41 is held in the position shown in FIG. 4 by the striking pin 15. The projections 46, 47 may preferably be integrated within the clamping straps 33, 35, analogously to a so-called "lug strap." Advantageous embodiments for the strap mounts 42, 43 are drilled-through plate folds, which are made directly in one piece with the mounting container 1, or slotted screws and nuts.

The transition from the readiness position into the use position of the oxygen generator 3 takes place such that by pulling the locking pin 18 via the cable 19, the striking pin 15 is released along the arrow 48, as a result of which the strap 41 is released from the locking position with the striking pin 15. Due to the strap 41 being released, the projections 46, 47 will be disengaged from the strap right-angle bends 44, 45, and the oxygen generator 3 will pivot around the axes 38, 39 from the readiness position into the use position.

Figure 5:
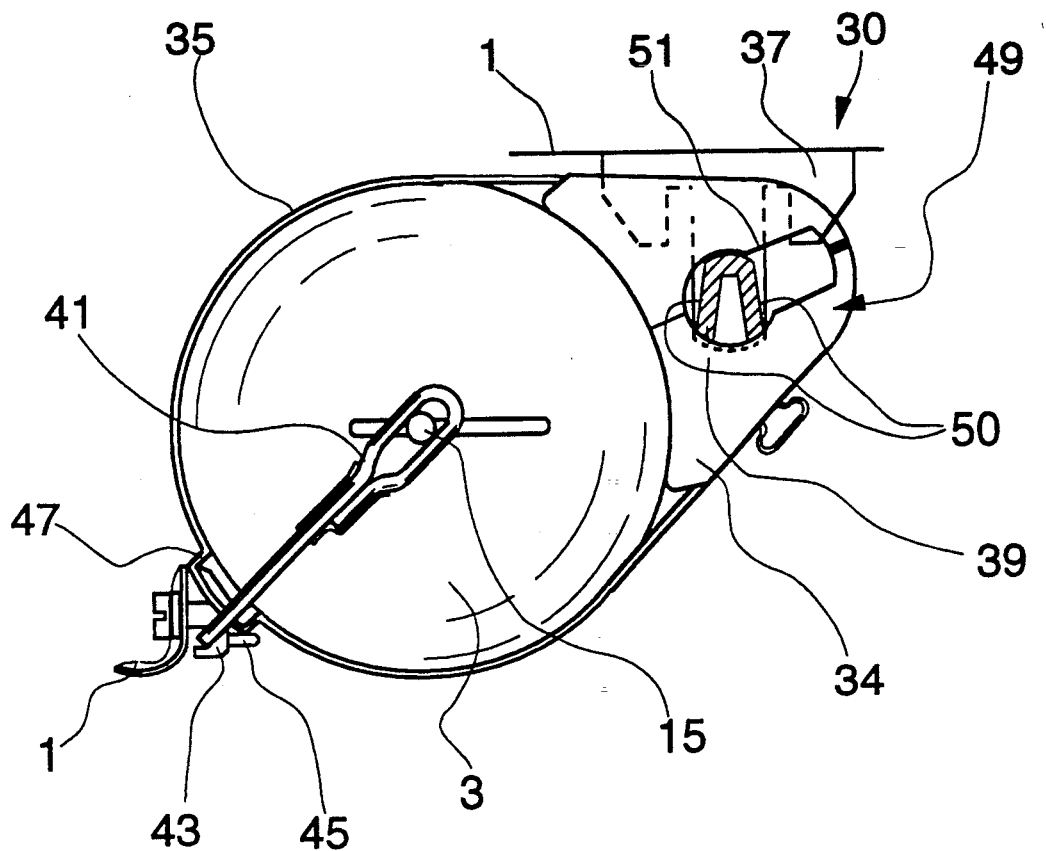
FIG. 5 is a schematic side view of the hinged holder according to FIG. 4 in the readiness position, viewed toward the striking pin.
Figure 6:
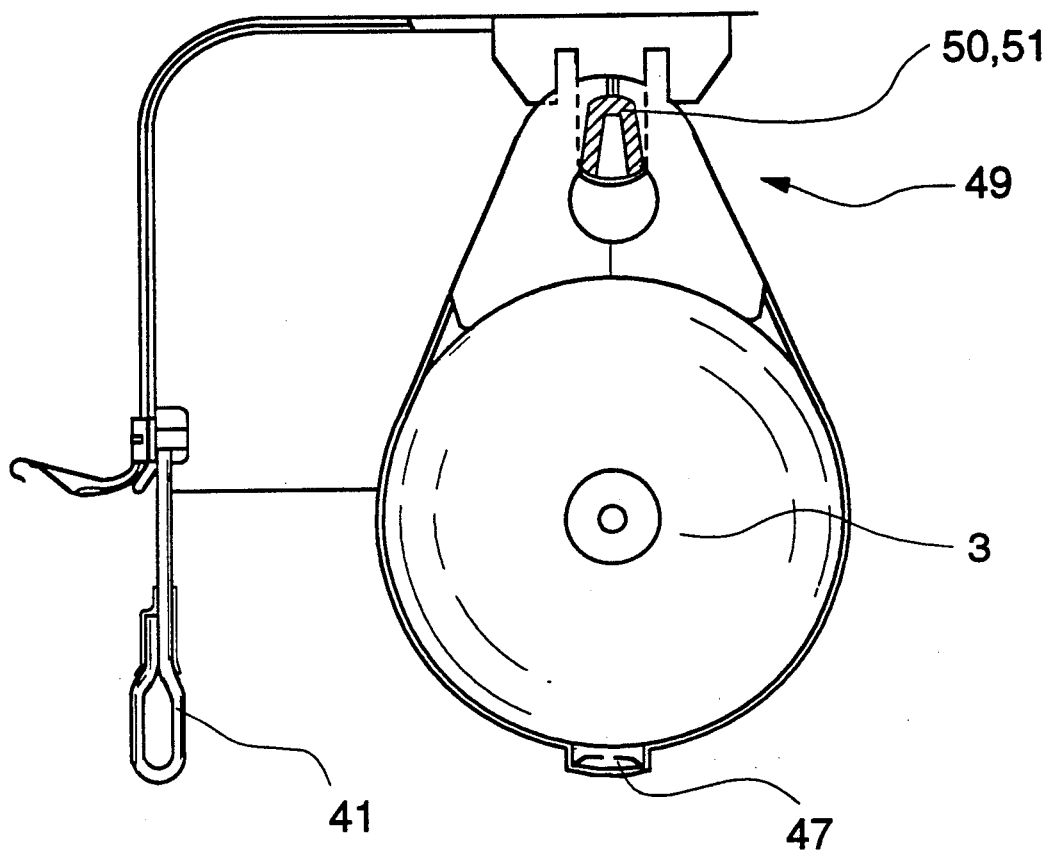
FIG. 6 is a schematic side view of the hinged holder according to FIG. 5 in the use position.

The transition from the readiness position into the use position is schematically illustrated in FIGS. 5 and 6. Identical components are designated by the same reference numerals as in FIG. 4.

FIG. 5 shows a sectional side view of the hinged holder 30 viewed toward the striking pin 15 in the readiness position of the oxygen generator 3. For clarity's sake, only part of the mounting container 1 is shown. Due to the projecting striking pin 15, the strap 41 is located in the locked position, and the second projection 47 of the second clamping strap 35 is blocked by the second strap right-angle bend 45. In the use position, the range of movement of the oxygen generator 3 is limited by a locking device 49. The locking device 49 consists of wedge-shaped flattened areas 50 on the axes 38, 39 and of slotted holes 51 of corresponding shape on the cartridge holders 32, 34. Only the second cartridge holder 34 and the second axis 39 are recognizable in FIG. 5.

FIG. 6 shows the oxygen generator 3 according to FIG. 5 in the use position.

In the pivoted-out vertical position of the oxygen generator 3, the flattened areas 50 (FIG. 5) of the locking device 49 are located, in a positive locking manner, in the slotted holes 51, thus fixing the oxygen generator 3 in the use position.

FIG. 7 shows the mask of the respirator system connected to a user. The mask is shown connected to the respirator embodiment shown in FIG. 1 but in a similar manner, the mask may be connected to the respirator embodiment as depicted in FIGS. 4 through 6. As mentioned above, normally three to four breathing masks are provided in the mounting container 1 but only one breathing mask is shown in the drawing.

While specific embodiments of the invention have been shown and described in detail to illustrate the application of the principles of the invention, it will be understood that the invention may be embodied otherwise without departing from such principles.

What is claimed is:

1. Respirator for emergency oxygen supply for passengers in aircraft, comprising:
    a mounting container;
    a lid for closing the mounting container;
    a breathing mask positionable within the mounting container;
    an oxygen generator positioned within said mounting container, said oxygen generator being connected to said breathing mask;
    holding means rigidly connected to said mounting container for permitting a position of said oxygen generator to change by pivoting between a readiness position and a use position, a distance between said oxygen generator and an inner wall surface of said mounting container being greater in said use position than in said readiness position.

2. A respirator according to claim 1, wherein:
    said oxygen generator includes an activating device coupled with said holding means of said oxygen generator, said oxygen generator moving from said readiness position to said use position only upon activation by said activating device.

3. A respirator according to claim 2 wherein:
    said holding means includes a pivoting holder for mounting said oxygen generator.

4. A respirator according to claim 3, wherein:
    said pivoting holding includes a hinge and spring mechanism.

5. A respirator according to claim 1 further comprising:
    fixed stop means for limiting a range of movement of said oxygen generator in said use position.

6. A respirator according to claim 5, further comprising:
   locking connection means for locking said oxygen generator in said use position.

7. A respirator according to claim 3, wherein:
   said activating device includes a spring-pretension striking pin, said oxygen generator including two jointing sleeves wherein said spring-pretension striking pin is positioned in one of said two jointing sleeves, a locking pin being provided engaging said striking pin wherein upon removal of said locking pin, said striking pin is released for activation of said oxygen generator, said pivoting holder is released whereby said oxygen generator will pivot out of said readiness position into said use position under the force of gravity.

8. A respirator according to claim 7, including a pretensioned spring to assist in pivotal movement of said oxygen generator.

9. A respirator according to claim 1, further comprising:
   a cartridge shaped housing accommodating said oxygen generator.

10. A respirator according to claim 1, wherein:
    said holding means is formed as a hinged holder attached to said oxygen generator for pivoting said oxygen generator around a fixed axis on said mounting container, between said readiness position and said use position.

11. A respirator according to claim 10, further comprising:
    said hinged holder, clamping straps, and cartridge mounts including cartridge holders attached to said oxygen generator by said clamping straps and mounted rotatably around axes in said cartridge mounts on said mounting container.

12. A respirator according to claim 11, wherein:
    said clamping straps include projections for locking said oxygen generator in said readiness position.

13. A respirator according to claim 10, further comprising:
    a strap compiling said oxygen generator with said hinged holder, said strap releasing said hinged holder during activation of said oxygen generator whereby said oxygen generator is moved from said readiness position into said use position.

14. A respirator according to claim 13, further comprising:
    strap mounts for mounting said strap axially rotatably and has strap right-angle bends and projectors engaged by said strap right-angle bends to lock said oxygen generator.

15. A respirator according to claim 10, wherein:
    said hinged holder includes a locking device limiting a range of movement in said use position.

16. A respirator according to claim 15, wherein:
    said locking device includes flattened areas on an axial shaft portion of said hinged holder and slotted holes of corresponding shape in said cartridge holders.

* * * * *